US 6,731,225 B2

(12) United States Patent  
Vopat

(10) Patent No.: US 6,731,225 B2  
(45) Date of Patent: May 4, 2004

(54) METHOD AND APPARATUS FOR DETECTING AND MEASURING THICKNESS OF ICE ON AIRCRAFT

(75) Inventor: Raymond Vopat, Nyack, NY (US)

(73) Assignee: Lockheed Martin Corporation, Bethesda, MD (US)

(*) Notice: Subject to any disclaimer, the term of this patent is extended or adjusted under 35 U.S.C. 154(b) by 20 days.

(21) Appl. No.: 10/075,966

(22) Filed: Feb. 14, 2002

(65) Prior Publication Data

US 2003/0169186 A1 Sep. 11, 2003

(51) Int. Cl.[7] .............................................. G08B 21/00
(52) U.S. Cl. ..................... 340/962; 340/580; 244/134 F
(58) Field of Search ................................. 340/962, 580, 340/945, 963, 964; 244/134 R, 134 F

(56) References Cited

U.S. PATENT DOCUMENTS

| 4,461,178 A | | 7/1984 | Chamuel .................... 73/599 |
| 4,570,881 A | | 2/1986 | Lustenberger .......... 244/134 F |
| 4,604,612 A | | 8/1986 | Watkins et al. .............. 73/590 |
| 4,628,736 A | | 12/1986 | Kirby et al. .................. 73/599 |
| 4,833,660 A | * | 5/1989 | Deom et al. ................ 367/157 |
| 5,095,754 A | * | 3/1992 | Hsu et al. ..................... 73/602 |
| 5,187,980 A | | 2/1993 | Blair et al. .................. 361/679 |
| 5,206,806 A | | 4/1993 | Gerardi et al. ........... 244/134 F |
| 5,467,944 A | | 11/1995 | Luukkala ................. 244/134 F |
| 5,474,261 A | | 12/1995 | Stolarczyk et al. ...... 244/134 F |
| 5,507,183 A | | 4/1996 | Larue et al. ................... 73/598 |
| 5,585,551 A | | 12/1996 | Johansson et al. ......... 73/64.53 |
| 5,922,958 A | | 7/1999 | Schugt ........................ 73/596 |
| 6,301,967 B1 | * | 10/2001 | Donskoy et al. ............. 73/579 |

* cited by examiner

*Primary Examiner*—Toan N Pham  
(74) *Attorney, Agent, or Firm*—Simpson & Simpson, PLLC

(57) ABSTRACT

A method and apparatus for measuring the thickness of ice on an aircraft member is disclosed. In the preferred embodiment, the apparatus is mounted beneath an aircraft member surface. The apparatus includes transducers for transmitting ultrasonic signals through the aircraft member and ice at predetermined applied voltages and frequencies. The apparatus measures the current and phase angle relative to voltage associated with each transducer and frequency. The apparatus calculates the impedance of the transducer transmitting through aircraft member and any ice accumulation from the applied voltage and measured current and phase angle relative to voltage at each of the predetermined frequencies. The apparatus then computes the ice thickness by determining the frequencies where the impedance is a peak. The invention also broadly comprises an apparatus and a method for the detection of ice on an aircraft member.

33 Claims, 3 Drawing Sheets

METHOD AND APPARATUS FOR DETECTING AND MEASURING THICKNESS OF ICE ON AIRCRAFT

FIELD OF THE INVENTION

This invention relates to the detection of ice on the surface of an aircraft. More specifically it relates to a method and apparatus for the measurement of the thickness of ice on an aircraft surface.

BACKGROUND OF THE INVENTION

It is well known that ice buildup on aircraft is a potentially serious safety issue. Ice buildup, in addition to increasing the weight of the aircraft, can interfere with the aerodynamic characteristics of the aircraft. In particular, ice buildup on wings changes the effective airfoil shape of the wing, and can possibly cause the flow over the wing to become turbulent. This reduces lift, increases drag, and makes the plane more difficult to control.

There are three types of ice that can form on an aircraft: rime, clear, and mixed. Rime tends to form from water that freezes as it hits the plane. Thus, rime generally forms on the leading edge of wings and tails. It is thicker than clear ice, as it traps air in it as it freezes. Clear ice does not entirely freeze as it hits. A portion of the water freezes on the initial contact surface, and then the rest freezes as it flows back over the aircraft. Clear ice has a denser buildup on the leading edge, and more buildup on the rest of the aircraft. Mixed ice is a combination of clear and rime ice. Clear ice can be the most dangerous, as most ice detection and deicing systems are installed at or near the leading edge of the wings and tail. Therefore, clear ice can buildup without the pilots realizing it, and it cannot be removed until the plane lands.

Various devices have been developed to detect the presence of ice on a surface such as an aircraft member. Often, they include locating a part of the detector on the outside surface of the aircraft. One example is shown in U.S. Pat. No. 5,585,551 (Johansson et al.). In the invention disclosed in this patent, a wire is routed through holes in the aircraft skin, along the outer surface, and back through holes to the inside of the aircraft. The problems with this system can include: weakening of the structure by drilling holes in the surface, adverse aerodynamic consequences by placing holes and wire on the surface, and the inability of the system to detect the thickness of the ice.

Other systems have attempted to avoid aerodynamic problems by mounting the apparatus within the aircraft. U.S. Pat. Nos. 4,604,612 (Watkins et al.) and 4,461,178 (Chamuel) disclose inventions that connect transducers to the inside surface and measure the effect on a wave that propagates down the surface from a transmitter to a receiver. These devices involve mounting the transmitter and receiver a significant space from each other such that the wave will propagate from one to the other. This reduces the locations on an aircraft where the transducers can be mounted. The effect of the ice on the wave will vary according to the thickness of the ice, which can vary along the path from the transmitter to the receiver. Thus, these methods are more effective at detecting the presence of ice, rather than measuring the thickness of ice buildup.

Methods to measure the thickness of ice have been disclosed, such as those discussed in U.S. Pat. Nos. 5,507,183 (Larue et al.) and 4,628,736 (Kirby et al.). Larue et al.'s invention includes a transmitter and receiver on a block mounted flush with the aircraft surface. It reflects an ultrasonic wave off the face of the block facing the outside. If there is ice on the surface, an additional reflection from the ice/air interface is received after the reflection from the block/ice interface. Measuring the time delay and knowing the speed of sound through ice enables calculation of the thickness. Kirby et al.'s invention uses one transmitter/receiver mounted flush with the surface to send ultrasonic waves out from the surface. If ice is present, it measures the time delay between the emission and reflection to find the thickness of the ice. Both of these devices are mounted flush to avoid interfering with the aerodynamics of the aircraft. However, this type of device can be more difficult to manufacture than a device mounted inside the surface. In addition, holes in the aircraft member's surface to accommodate these devices may reduce the structure's ability to bear loads.

Clearly, then, there is a longfelt need for an ice detection apparatus that can measure the thickness of ice on the aircraft surface which requires only minor structural changes to the aircraft to accommodate installation.

SUMMARY OF THE INVENTION

The present invention broadly comprises a method and apparatus for measuring the thickness of ice on an aircraft member. In the preferred embodiment, the apparatus is mounted beneath an aircraft member surface. The apparatus includes transducers for transmitting ultrasonic signals through the aircraft, member and ice at predetermined applied voltages and frequencies. The apparatus measures the current and current phase angle, relative to the applied voltage, associated with each transducer and frequency. The apparatus calculates the resistive component of the impedances of the transducers which will peak at frequencies dependent upon the thickness of ice accumulation on the aircraft member. The impedance will peak where the combined thickness of the aircraft member and the ice is an odd multiple of a quarter wavelength of the transmitted signal. The apparatus then computes the ice thickness by determining those frequencies where the impedance is a peak, calculating the thickness of the ice and member based upon the determined frequencies and their wavelength relationships, and subtracting the member thickness. The invention also broadly comprises an apparatus and a method for the detection of ice on an aircraft member.

A general object of the present invention is to provide an apparatus and method for measuring the thickness of ice on an aircraft surface.

Another object of the present invention is to provide an apparatus and method for detecting the presence of ice on an aircraft surface.

It is a further object to provide an apparatus that can be mounted inside the surface of the aircraft.

It is still a further object to provide an apparatus that is small enough in size such that it can be mounted inside small surfaces of the aircraft, so that the thickness of ice can be measured in the maximum number of locations.

These and other objects, features and advantages of the present invention will become readily apparent to those having ordinary skill in the art upon a reading of the following detailed description of the invention in view of the drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE PREFERRED EMBODIMENT

It should be appreciated that, in the detailed description of the invention which follows, like reference numbers on different drawing views are intended to identify identical structural elements of the invention in the respective views.

Figure 1:
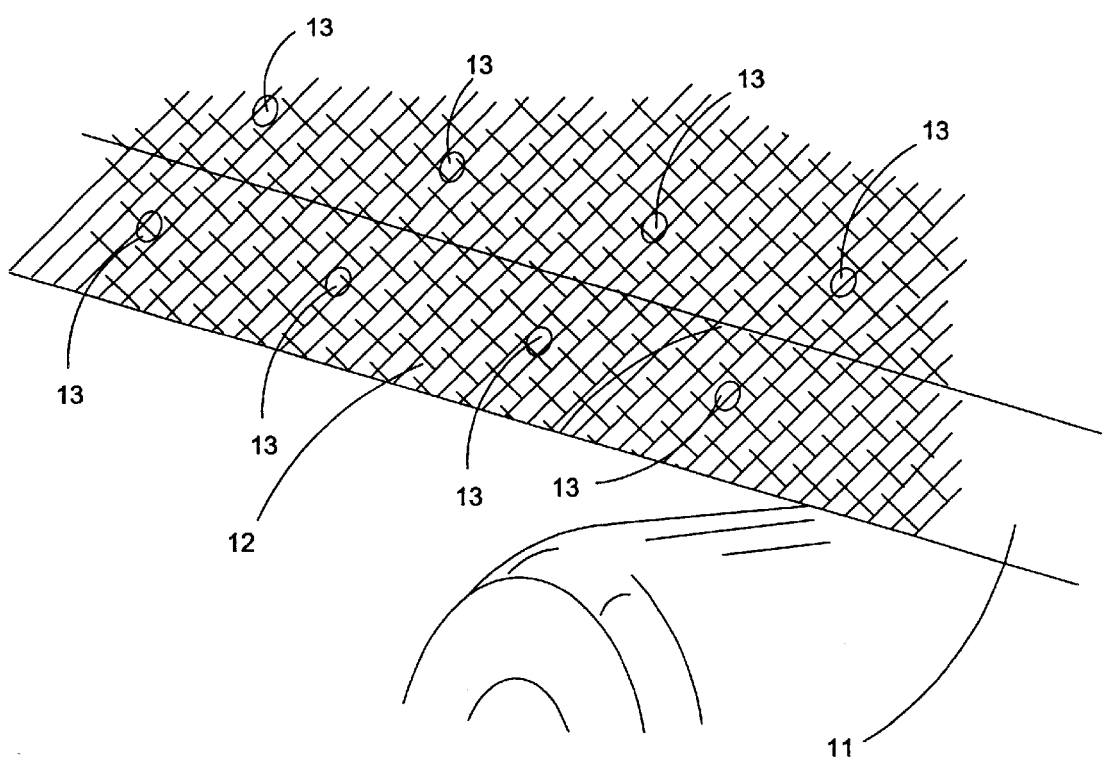
FIG. 1 is a view of the iced wing with the present invention installed inside the wing.

FIG. 1 is a fragmentary view of wing surface 11 of a wing of an aircraft. The wing is shown in position above a jet engine, shown in fragmentary perspective view. In the view shown in FIG. 1, the wing surface is substantially covered by ice layer 12. Transducers 13 are shown in this drawing mounted beneath wing surface 11.

Figure 2:
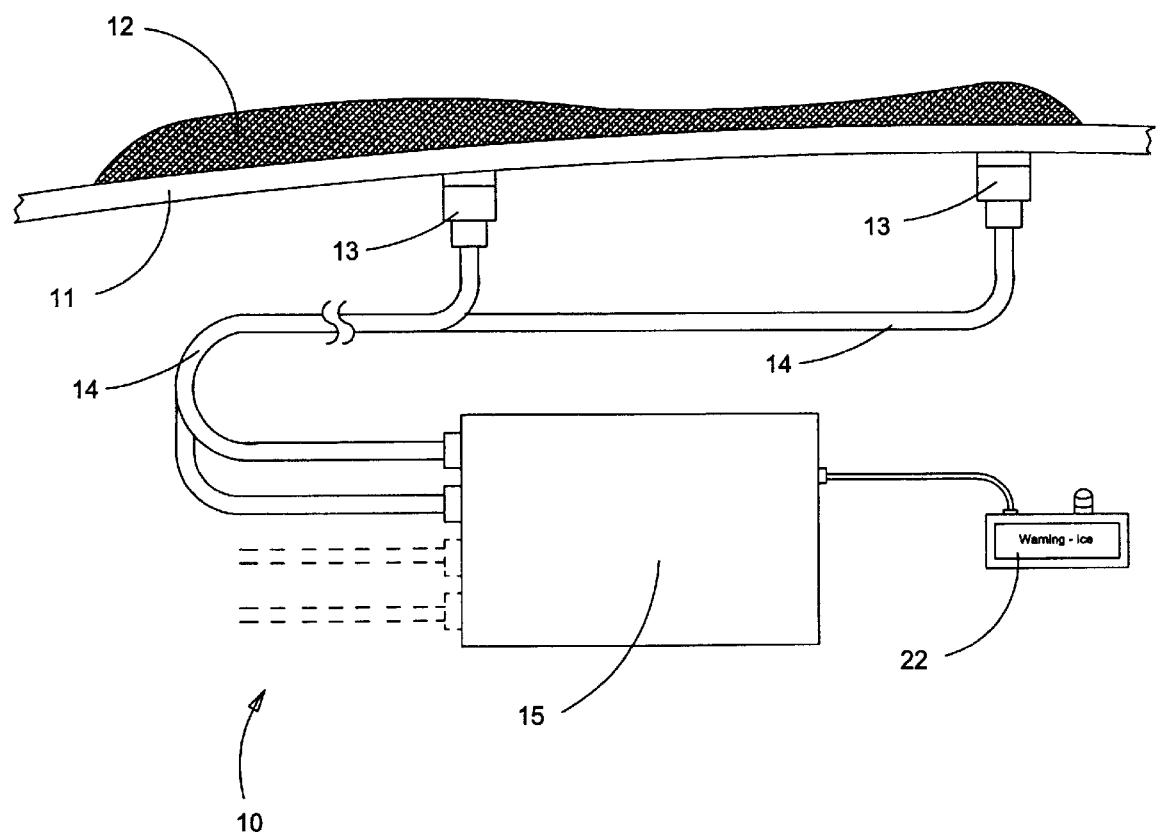
FIG. 2 is a top view of the preferred embodiment of the present invention installed behind an aircraft surface, with the transducers mounted behind the surface.

A top view of the preferred embodiment of ice thickness measurement apparatus 10 is shown in FIG. 2. Here, transducers 13 are mounted behind wing surface 11. Cables 14 are routed from transducers 13 to system-processing unit 15. System-processing unit 15 can be located anywhere in the aircraft. In a preferred embodiment, transducers 13 are mounted in wing and/or tail surfaces. Alarm/display 22 is connected to system-processing unit 15.

Figure 3:
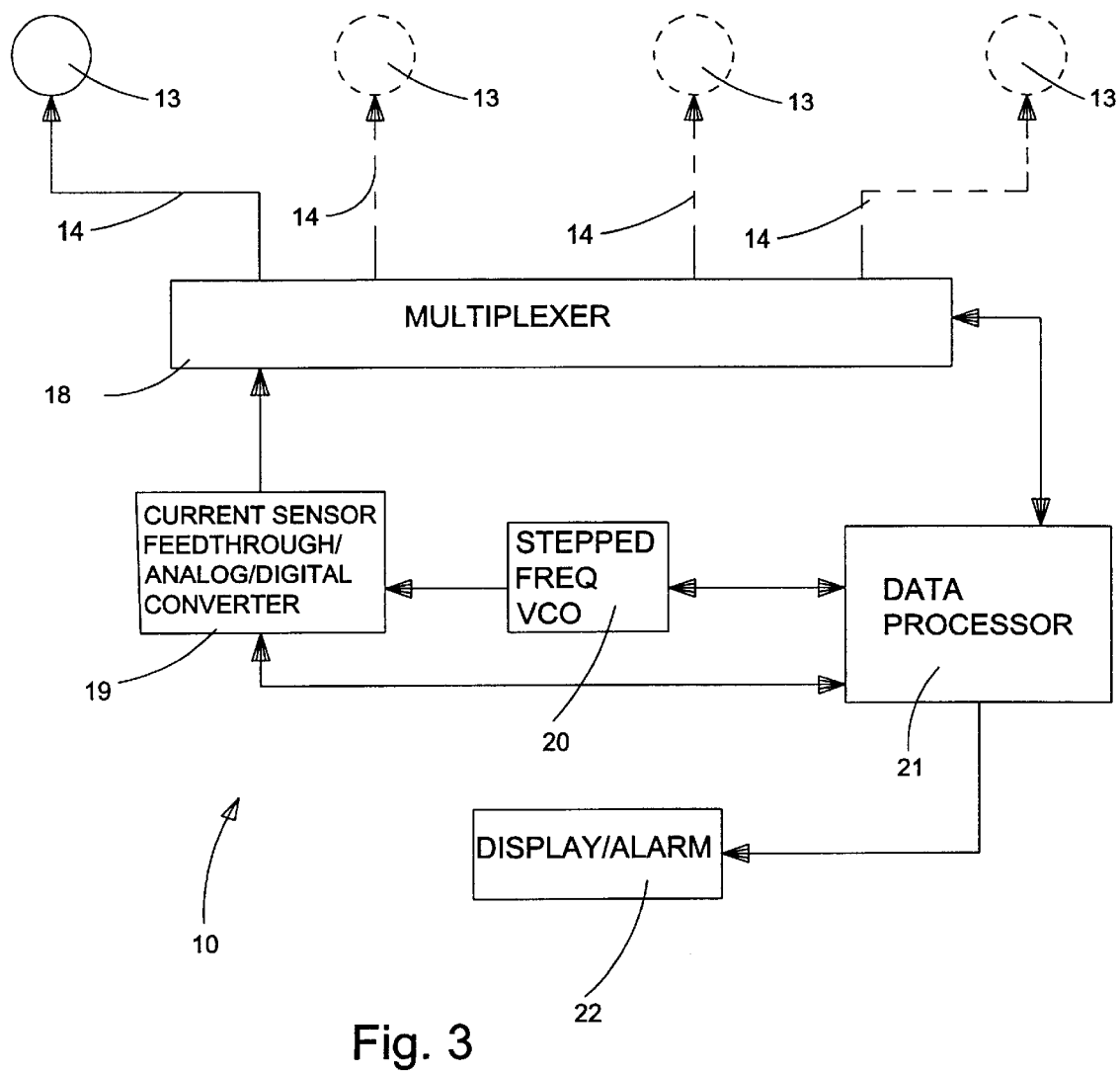
FIG. 3 is a block diagram of the system processing method of the invention.

The system processing method and apparatus of the invention is depicted in FIG. 3. System-processing unit 15 contains multiplexer 18, current sensor feedthrough analog-to-digital converter 19, stepped frequency voltage controlled oscillator (VCO) 20, and data processor 21. In a preferred embodiment, system-processing unit 15 is connected to display/alarm 22 to inform aircraft personnel of the existence and level of ice buildup.

The complex impedance of each of the transducers during the transmissions at various frequencies are measured by sampling the current into each transducer and measuring the current amplitude and phase angle relative to the input voltage. The transducer impedance is affected by the combined member/ice-layer thickness because of the reflected waves from the ice-air interface combining with the directly transmitted waves. The frequencies associated with the data samples provide information about the composite thickness of the member/ice layer (if the transducer is internally mounted, as in the preferred embodiment) or the ice layer itself (if flush mounted). For the preferred embodiment, reference values previously stored in memory, from calibration scans performed when there was no ice layer present, provide an estimate of the thickness of the member alone. The ice layer thickness can then be calculated by subtraction.

The ice thickness measurement process measures the ice thickness based on the principle that the combined aircraft surface and ice layer will act as an acoustic transformer. The resistive component of impedance will peak where the combined thickness of the aircraft member (surface skin) and the ice is an odd multiple of a quarter wavelength of the transmitted signal. Frequencies at which a maximum resistive component of the impedance occurs can consequently be identified. The apparatus then computes the ice thickness by computing the thickness which corresponds to the maximum resistive impedance frequency set and the known acoustic velocity of the member and ice. From the total set of frequencies, the fundamental frequency corresponding to that for which the member/ice thickness is just a single one-quarter wavelength can be calculated, and together with the known acoustic velocity, the thickness of the composite layer can be computed.

For the ice thickness measurement process to be run, the transmitted frequencies of interest need to be computed. When the combined ice/member thickness is an odd multiple of a quarter wavelength, the resistive component of the impedance measured by the invention will be a maximum. Thus, the ice thickness measurement process needs to measure the impedance near frequencies where the combined aircraft surface and ice layer are odd multiples of a quarter wavelength of the emitted ultrasound. The lowest (fundamental) frequency is that for which the combined layer is just one-quarter wavelength.

Data processor 21 computes the range of the fundamental frequency based on the minimum and maximum thickness that could be encountered. Thus, the band of fundamental frequencies are chosen such that:

$$f_L < \frac{c}{4d_{max}} \text{ and } f_H > \frac{c}{4d_{min}}$$

where $f_L$ is the lowest likely fundamental frequency, $f_H$ is the highest likely fundamental frequency, c is the speed of sound in ice for the flush mounting and the average acoustic speed through the aircraft skin and ice for the preferred embodiment, $d_{max}$ is the maximum composite thickness estimate, and $d_{min}$ is the minimum thickness estimate (i.e. of the member alone).

In the preferred embodiment, the maximum thickness to be detected (measured) is that of skin 11 plus ice layer 12. (The thickness of skin 11 is measured with no ice layer 12 on it as discussed below). Thus, the minimum thickness estimate is the thickness of member 11 alone. For the flush mounted transducer embodiment, the thickness estimates are for ice layer 12 alone.

The stepped frequency VCO 20 sends a voltage to transducer 13 at the frequencies determined above to begin the ice thickness measurement process. Multiplexer 18 samples the transmission currents at a high enough rate compared to the stepped frequency rate such that each sample corresponds to a particular transducer 13 and a particular frequency. Data processor 21 receives the digitized current samples and associates them with the corresponding frequency. Data processor 21 then computes the impedance of the aircraft surface and ice layer seen by transducer 13 based on the voltage commanded to VCO 20 and the current magnitude and phase, relative to the voltage, measured by data processor 21. Data processor 21 then determines where the peaks are in the real component of the impedance (resistance). This is done because the resistance will peak at odd whole multiples of a quarter wavelength, since the combined aircraft surface and ice layer will act as a transformer between transducer 13 and the ice/air surface at these frequencies. If the fundamental frequency calm be used, then the combined thickness can then be determined based on the following equation:

$$d_t = \frac{\lambda_1}{4} = \frac{c}{4f_1}$$

where $d_t$ is the total layer thickness, c is the average speed of sound in ice and aluminum, $\lambda_1$ is the wavelength at the fundamental frequency with a peak in resistance, and $f_1$ is the fundamental frequency with a peak in resistance.

Should it be impractical, or otherwise not desirable to use the fundamental frequencies then a selected frequency band can be used that corresponds to a whole odd multiple of the fundamental frequency ($f_1$) described above. For this arrangement, the lowest resistive-peak frequency in the selected band will be defined as $f_2$ and the next highest resistive-peak frequency as $f_3$. The ratio of $f_3$ to $f_2$ will then define the thickness $d_t$ as a function of $f_2$ in accordance with the following table:

| Ratio of $f_3$ to $f_2$ | $d_t$ |
|---|---|
| 3:1 | $c/4f_2$ |
| 5:3 | $3c/4f_2$ |
| 7:5 | $5c/4f_2$ |
| 9:7 | $7c/4f_2$ | where $f_2$ is the lowest frequency observed with a resistive-peak, $f_3$ is the next highest frequency observed with a resistive-peak, $d_t$ is the total layer thickness, and c is the average speed of sound in ice and aluminum.

In the preferred embodiment, transducers 13 are mounted behind aircraft skin 11. Since the ultrasonic impedance of ice is close to that of aluminum, the ice will appear to be a thickening of the aluminum layer. Thus, the system will take measurements with no ice on skin 11 and determine the thickness of skin 11 using the above method. During operation, the total thickness measurement will have the thickness of skin 11 previously determined subtracted off.

$$d_i = d_t - d_s$$

where $d_i$ is the ice layer thickness, $d_t$ is the total layer thickness computed above, and $d_s$ is the thickness of skin 11 computed with no ice present.

If the flush mounted transducer embodiment is used, then c in the above equations is the speed of sound in ice and the layer thickness $d_t$ computed is the thickness of ice 12 alone.

If the ice layer computed exceeds a preset limit, alarm 22 can be set off. The data can also so be shown on display 22.

Apparatus 10 may run the ice thickness measurement process at times when it is known that there is no ice layer 12 on aircraft skin 1. The impedance values measured can then be compared to stored impedance measurements, and corrections to the thickness of skin 11, $d_s$, may be made to account for drift in the apparatus due to, for example, temperature changes.

Thus, it is seen that the objects of the present invention are efficiently obtained, although modifications and changes to the invention should be readily apparent to those having ordinary skill in the art, and these modifications are intended to be within the spirit and scope of the invention as claimed. For example, it should be readily apparent to one skilled in the art that the present invention could be used simply to detect the presence of ice on an aircraft member. The detection of ice on an aircraft member by the measurement of impedance as disclosed above is within the spirit and scope of the invention as claimed.

What is claimed is:

1. A method for measuring a thickness of ice on an aircraft member, comprising:

transmitting ultrasonic signals through said ice at predetermined applied voltages and frequencies;

measuring current and phase angle relative to voltage associated with each of said frequencies;

calculating impedance of a transducer from said applied voltage and measured current and phase angle relative to voltage at each of said predetermined frequencies;

determining frequencies where said impedance is a peak; and determining thickness of said ice accumulated on said aircraft member based upon said peak impedance frequency values.

2. The method recited in claim 1 further comprising:

comparing thickness of member and ice to known thickness of said aircraft member with no ice accumulated thereon.

3. The method recited in claim 1 further comprising:

sending data to a device that can display it to aircraft personnel.

4. The method recited in claim 1 further comprising:

sending a signal to an alarm if said ice thickness measurement exceeds a preset limit.

5. An apparatus for measuring a thickness of ice on an aircraft member, comprising:

means for transmitting ultrasonic signals through said ice at predetermined applied voltages and frequencies;

means for measuring current and phase angle relative to voltage associated with each of said frequencies;

means for calculating impedance of a transducer from said applied voltage and measured current and phase angle relative to voltage at each of said predetermined frequencies;

means for determining frequencies where said impedance is a peak; and means for determining thickness of said ice accumulated on said aircraft member based upon said peak impedance frequency values.

6. The apparatus recited in claim 5 further comprising means to display said ice thickness measurement.

7. The apparatus recited in claim 5 further comprising means to activate alarm if said ice thickness measurement exceeds a preset limit.

8. The apparatus recited in claim 5 wherein the means for transmitting ultrasonic signals through said ice at predetermined applied voltages and frequencies comprises an ultrasonic transducer.

9. The apparatus recited in claim 5 wherein the means for measuring current and phase angle relative to voltage associated with each of said frequencies comprises a microprocessor connected with said ultrasonic transducer.

10. The apparatus recited in claim 5 wherein the means for calculating impedance of a transducer from said applied voltage and measured current and phase angle relative to voltage at each of said predetermined frequencies comprises said microprocessor.

11. The apparatus recited in claim 5 wherein the means for determining frequencies where said impedance is a peak comprises said microprocessor.

12. The apparatus recited in claim 5 wherein the means for determining thickness of said ice accumulated on said aircraft member based upon said peak impedance frequency values comprises said microprocessor.

13. An apparatus for measuring a thickness of ice on an aircraft member, comprising:

an ultrasonic transducer mounted proximate to surface of said aircraft member, said transducer transmitting ultrasonic signals through said ice at predetermined applied voltages and frequencies; and a microprocessor, said microprocessor measuring current and phase angle relative to voltage associated with each of said frequencies, calculating impedance of said transducer from said applied voltage and measured current and phase angle relative to voltage at each of said predetermined frequencies, determining frequencies where said impedance is a peak, and determining thickness of said ice accumulated on said aircraft member based upon said peak impedance frequency values.

14. The apparatus recited in claim 13 further comprising a display connected to said microprocessor for displaying said ice thickness measurement to human personnel.

15. The apparatus recited in claim 13 further comprising an alarm connected to said microprocessor that is set off when said ice thickness measurement exceeds a preset limit.

16. The apparatus recited in claim 13 further comprising a plurality of ultrasonic transducers mounted proximate to surface of said aircraft member, said transducers transmitting ultrasonic signals through said ice at predetermined applied voltages and frequencies.

17. A method for measuring a thickness of ice on an aircraft member, comprising:
calculating an impedance of a transducer, wherein said impedance calculation comprises calculating said impedance of said transducer from a commanded voltage of a transmitted signal and a measured current and phase angle relative to voltage; and
determining thickness of said ice accumulated on said aircraft member based upon said impedance.

18. The method recited in claim 17 further comprising: transmitting said signal through said ice.

19. The method recited in claim 17 wherein said signal is an ultrasonic signal.

20. The method recited in claim 17 wherein said impedance is calculated at a plurality of frequencies.

21. The method recited in claim 20 wherein said plurality of frequencies comprises a band from a low frequency to a high frequency.

22. The method recited in claim 21 wherein said low frequency is approximately equal to an average speed of sound through said aircraft member and said ice divided by four times a maximum thickness of said aircraft member and ice layer desired to be measured.

23. The method recited in claim 21 wherein said high frequency is approximately equal to an average speed of sound through said aircraft member and said ice divided by four times a minimum thickness of said aircraft member and ice layer desired to be measured.

24. An apparatus for measuring said thickness of ice on an aircraft member, comprising:
means for calculating impedance of a transducer from a commanded voltage of a transmitted signal and a measured current and phase angle relative to voltage; and
means for determining thickness of said ice accumulated on said aircraft member based upon said impedance.

25. The apparatus recited in claim 24 wherein the means for calculating impedance of a transducer comprises a microprocessor connected to said transducer.

26. The apparatus recited in claim 24 wherein the means for determining thickness of said ice accumulated on said aircraft member based upon said impedance values comprises said microprocessor.

27. The apparatus recited in claim 24 further comprising means for transmitting a signal through said aircraft member.

28. The apparatus recited in claim 27 wherein the means for transmitting a signal through said aircraft member comprises said transducer.

29. The apparatus recited in claim 28 wherein said transducer is an ultrasonic transducer.

30. The apparatus recited in claim 27 wherein said signal is an ultrasonic signal.

31. A method for detecting existence of ice on an aircraft member, comprising:
transmitting ultrasonic signals at predetermined applied voltages and frequencies;
measuring current and phase angle relative to voltage associated with each of said frequencies;
calculating impedance of a transducer from said applied voltage and measured current and phase angle relative to voltage at each of said predetermined frequencies;
determining frequencies where said impedance is a peak; and
determining existence of said ice accumulated on said aircraft member based upon said peak impedance frequencies.

32. An apparatus for detecting existence of ice on an aircraft member, comprising:
an ultrasonic transducer mounted proximate to surface of said aircraft member, said transducer transmitting ultrasonic signals at predetermined applied voltages and frequencies; and
a microprocessor, said microprocessor measuring current and phase angle relative to voltage associated with each of said frequencies, calculating impedance of said transducer from said applied voltage and measured current and phase angle relative to voltage at each of said predetermined frequencies, determining frequencies where said impedance is a peak, and determining existence of said ice accumulated on said aircraft member based upon said peak impedance frequencies.

33. The apparatus recited in claim 32 further comprising a plurality of ultrasonic transducers mounted proximate to surface of said aircraft member, said transducers transmitting ultrasonic signals through said ice at predetermined applied voltages and frequencies.

* * * * *